United States Patent Office 2,694,705
Patented Nov. 16, 1954

2,694,705

N-HYDROXYALKYL AMINOALKANOYLPHENO-THIAZINES AND THEIR DERIVATIVES AND SALTS

John W. Cusic, Skokie, Ill., assignor to G. D. Searle & Co., Chicago, Ill., a corporation of Illinois No Drawing. Application November 21, 1951, Serial No. 257,661

10 Claims. (Cl. 260—243)

This invention relates to compounds of the phenothiazine series having in the 10-position an aminoalkanoyl radical, to salts thereof, and to processes for producing such compounds. More particularly, this invention relates to new compositions of matter having the following general structural formula

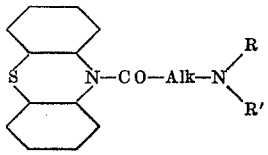

wherein Alk is a lower alkylene radical, R is a lower hydroxyalkyl radical, and R' is a member of the class consisting of hydrogen, lower alkyl, lower cycloalkyl and lower hydroxyalkyl radicals, as well as to acid addition and quaternary ammonium salts of such bases.

The compounds of the above general formula are useful as intermediates in the preparation of complex organic molecules such a pharmaceuticals. They are also of value as antioxidant, antiseptic, and surface-active agents, as well as medicinal agents such as diuretic, cardiovascular, and antispasmodic drugs. It is an object of this invention to provide novel compositions of matter which are of value for the foregoing uses. It is a further object to provide simple and efficient methods for manufacturing such substances.

In the foregoing general structural formula, Alk represents lower alkylene radicals containing between 1 and 10 carbon atoms, and preferably having 1 to 3 carbon atoms between the CO and NRR' groups. The radical Alk is a bivalent radical derived from a saturated aliphatic hydrocarbon radical, and includes such radicals as methylene, ethylene, propylene, the butylenes, and amylenes, and trimethylene, tetramethylene, and polymethylene radicals containing 1 to 10 carbon atoms. The radical R represents a lower hydroxyalkyl radical such as hydroxymethyl, hydroxyethyl, β-hydroxypropyl, γ-hydroxypropyl, β-hydroxyisopropyl, hydroxybutyl, hydroxy-sec-butyl, hydroxy-tert-butyl, hydroxyamyl or hydroxyhexyl radical. The radical R' can be of the same type as radical R. It can also be a hydrogen or lower alkyl radical such as methyl, ethyl, straight-chained and branch-chained propyl, butyl, amyl or hexyl or a cycloalkyl radical such as cyclopropyl, cyclobutyl, cyclopentyl, cyclohexyl, methylcyclopentyl, and ethylcyclohexyl.

The phenothiazine nucleus of the foregoing compounds may be substituted in the benzenoid rings by halogen, lower alkyl or lower alkoxyl radicals.

Oxides of the compounds of this invention can be obtained by oxidizing a tertiary amine of the above general formula with 30–90% hydrogen peroxide in an inert solvent such as alcohol. Such oxides are generally water-soluble crystalline substances and have the type formula.

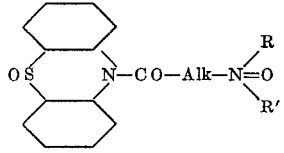

all symbols being defined as hereinabove. The oxidation usually takes place on both the nitrogen and sulfur atoms, producing an N-oxide as well as an S-oxide group.

The amino compounds which make up this invention are only slightly soluble in water, but are generally soluble in the common organic solvents. They readily form salts with acids, which salts are generally water soluble. Among the acids which are suitable for forming such salts are hydrochloric, hydrobromic, sulfuric, phosphoric, tartaric, citric, sulfamic, acetic, malic, maleic, benzoic, and similar common organic and inorganic acids which provide anions which are non-toxic in usual dosages. The 8-halogenated xanthines such as 8-chlorotheophylline, 8-bromotheophylline, and 8-chlorotheobromine are also satisfactory. Salts may also be formed by reacting the basic ketones with reactive esters of strong acids, to form quaternary ammonium salts. Such salts can be formed, for example, by reaction with esters such as methyl iodide, methyl chloride, ethyl bromide, propyl chloride, ethylene bromohydrin, propylene chlorohydrin, benzyl chloride, phenethyl bromide, dimethyl sulfate, methyl toluenesulfonate, ethyl benzenesulfonate, β-acetoxyethyl bromide, and related esters.

The compounds of this invention may be prepared by treating a compound having the following formula

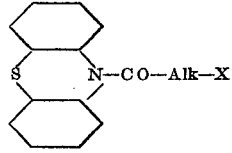

wherein Alk is a lower alkylene radical, and X represents halogen, with a primary or secondary (i. e., tertiary) aliphatic or aliphatic-type amine of the formula H—NRR' preferably at elevated temperature, in the presence of an inert solvent. In practice, it is preferred to use 2 to 3 moles of the amine for each mole of haloalkanoyl phenothiazine, in order that excess amine may bind the halogen acid split out during the reaction. It is preferred to run the reaction at temperatures of the range of 50–150° centigrade for a period of several hours. At the completion of the reaction, the amine salt is removed and the solution of the aminoalkanoyl phenothiazine base in the organic solvent is isolated. The base may be obtained in a state of purity by conventional procedures such as evaporation of the solvent and distillation, or the base may be converted to the acid addition salt by treatment of the solution with an equivalent amount of acid.

My invention is disclosed in further detail by the following examples, which present specific embodiments of my invention, without, however, limiting it in spirit or in scope. The amounts of materials are given in parts by weight and temperatures are given in degrees centigrade (° C.).

The present application is a continuation-in-part of my copending application, Serial No. 22,505, filed on April 21, 1948 which was issued as United States Patent No. 2,591,679, dated April 8, 1952.

Example 1

112 parts of phenothiazine and 73 parts of β-chloropropionyl chloride in 550 parts of benzene are refluxed for 20 hours. The hot solution is filtered and evaporated. The residue of 10-β-chloropropionylphenothiazine is recrystallized from alcohol, and melts at 135–136° C.

150 parts of 10-β-chloropropionylphenothiazine and 85 parts of piperidine in 870 parts of dry toluene are refluxed for 6 hours. The cooled solution is extracted with dilute mineral acid, and the acid extract is made alkaline and extracted with ether. The ether extract is dried and evaporated. The residue of 10-β-piperidinopropionylphenothiazine distils at 220–230° C. at 3 millimeters pressure. It is converted to the hydrochloride by treating a dry ether solution of the base with absolute alcoholic hydrogen chloride. The hydrochloride so formed is recrystallized from isopropanol and melts at 203–205° C.

By a reaction analogous to the foregoing but employing morpholine instead of piperidine, there is formed 10-β-morpholinopropionylphenothiazine which is a viscous high-boiling oil. By an alternative method 300 parts of 10-β-chloropropionylphenothiazine, 300 parts of morpholine, and 10 parts of potassium iodide in 800 parts of methyl ethyl ketone are heated at reflux temperature for 12 hours, cooled, and treated with dilute hydrochloric acid. The aqueous layer is separated and upon treatment with ether the crystalline hydrochloride of the 10 - β - morpholinopropionylphenothiazine is obtained which, recrystallized from a mixture of isopropanol and ether, melts at about 222–223° C.

*Example 2*

29 parts of 10-β-chloropropionylphenothiazine and 12 parts of dimethylamine in 80 parts of methyl ethyl ketone containing 0.5 part of potassium iodide are heated in a closed vessel at 60–65° C. for 48 hours. The cooled reaction mixture is extracted with dilute mineral acid. The mineral acid solution is made alkaline and extracted with ether. After removal of the ether, the residue of 10-β-dimethylaminopropionylphenothiazine is crystallized from petroleum ether and melts at 86–88° C. When dissolved in ether and treated with absolute alcoholic hydrogen chloride, it forms a crystalline hydrochloride.

In a similar manner using 35 parts of dibutylamine in place of the dimethylamine one obtains 10-β-dibutylaminopropionylphenothiazine, which has the following structural formula

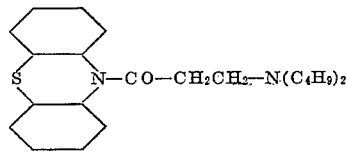

*Example 3*

15 parts of 10-β-dimethylaminopropionylphenothiazine and 5 parts of methyl chloride in 40 parts of acetone are mixed and allowed to stand at room temperature in a closed vessel. A precipitate of the quaternary salt, 10-β-dimethylaminopropionylphenothiazine methochloride, begins to form in about half an hour. After 15 hours, this is removed by filtration, washed and dried. After recrystallization from methyl ethyl ketone, it melts at about 208° C.

By a similar method using 11 parts of ethyl bromide there is produced the corresponding quaternary salt, 10-β-dimethylaminopropionylphenothiazine ethobromide.

*Example 4*

50 parts of phenothiazine and 36 parts of β-chlorobutyryl chloride in 350 parts of dry toluene are refluxed for about 15 hours. The hot solution is treated with decolorizing charcoal, filtered and evaporated. The residue of 10-β-chlorobutyrylphenothiazine is recrystallized from alcohol and melts at 158–160° C.

51 parts of 10-β-chlorobutyrylphenothiazine and 18 parts of dimethylamine in 80 parts of acetone containing 1 part of potassium iodide are heated in a closed vessel at 60° C. for 5 days. At the end of that time the solution is evaporated and the residue of 10-β-dimethylaminobutyrylphenothiazine crystallizes on standing. After recrystallization from petroleum ether, the base melts at 90–91° C. The hydrochloride is prepared by treating a dry ether-benzene solution of the base with absolute alcoholic hydrogen chloride. The 10-β-dimethylaminobutyrylphenothiazine hydrochloride is recrystallized from methyl ethyl ketone in the presence of decolorizing charcoal, and melts at 136–138° C.

By the reaction of the same quantities of 10-γ-chlorobutyrylphenothiazine (produced from phenothiazine and γ-chlorobutyryl chloride by the above process) and dimethylamine in acetone containing a trace of potassium iodide there is formed 10-γ-dimethylaminobutyrylphenothiazine, which, recrystallized from petroleum ether, melts at about 93–94° C. The hydrochloride melts at about 190–192° C.

*Example 5*

20 parts of 10-β-dimethylaminobutyrylphenothiazine and 8 parts of methyl chloride in 60 parts of methyl ethyl ketone are heated in a closed vessel for ½ hour at 60° C. and allowed to stand for 15 hours at room temperature. The heavy precipitate of the quaternary salt, 10-β-dimethylaminobutyrylphenothiazine methochloride, is removed by filtration, dried and recrystallized from isopropanol. This salt melts at 210–212° C.

By the same procedure, using 20 parts of benzyl chloride, there is formed the corresponding quaternary salt, 10-β-dimethylaminobutyrylphenothiazine benzylchloride.

*Example 6*

Other compounds which are produced by the foregoing procedures include the following:

A. 10-β-isopropylaminovalerylphenothiazine.

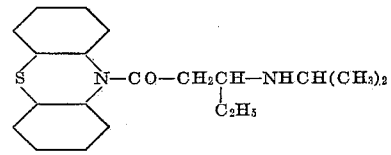

B. 10-γ-pyrrolidinobutyrylphenothiazine

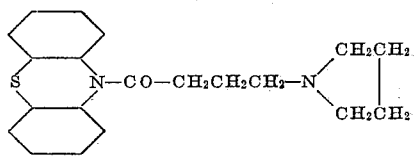

C. 10-methylethylaminoacetylphenothiazine

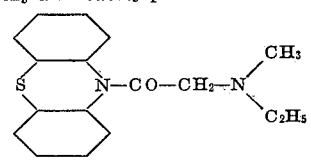

D. 10-β-dimethylaminopropionylphenothiazine 5-monoxide N-oxide

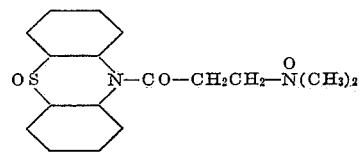

E. 10-β-dibutylaminopropionylphenothiazine 5-monoxide

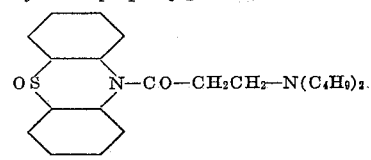

*Example 7*

A mixture of 58 parts of 10-β-chloropropionylphenothiazine and 40 parts of diethylamine in 120 parts of methyl ethyl ketone containing 1 part of potassium iodide is heated in a closed reactor for 5 days at 60–65° C. At the end of this period the solvent is removed and a portion of the residue of 10-β-diethylaminopropionylphenothiazine is distilled at 210–212° C. at 2 mm. pressure. It forms a crystalline hydrochloride melting at about 163–164° C.

By the same method 10 parts of 10-β-chloropropionylphenothiazine are reacted with 7 parts of methylethanolamine and there is produced 10-β-methylethanolaminopropionylphenothiazine, which has the formula

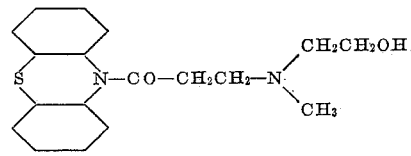

Recrystallized from ethanol it melts at about 129–130° C.

*Example 8*

A mixture of 125 parts of phenothiazine and 71 parts of chloroacetyl chloride in 800 parts of benzene is heated at reflux temperature for 10 hours and then stirred with charcoal and filtered. The solvent is removed from the filtrate and the resulting solid residue crystallized from ethanol, using charcoal for further clarification. The 10-chloroacetylphenothiazine thus obtained melts at about 110–112° C.

650 parts of this product are heated with 250 parts of dimethylamine and 10 parts of potassium iodide in 800 parts of methyl ethyl ketone at 60° C. and in a pressure reactor for 8 hours. The solution is evaporated and the residue is extracted with hydrogen chloride and the extract rendered alkaline. The 10-dimethylamino-acetylphenothiazine is thus obtained as a solid which, recrystallized from ethanol with charcoal clarification, melts at about 144–145° C. A solution of this base in ether and benzene is treated with 1 equivalent of an alcoholic hydrogen chloride solution with cooling and stirring. The precipitate is collected on a filter and dried. It melts at about 230–231° C.

*Example 9*

650 parts of 10-dimethylaminoacetylphenothiazine are treated with 400 parts of diethylamine and 10 parts of potassium iodide in 800 parts of methyl ethyl ketone by the method of Example 8, yielding 10-diethylamino-acetylphenothiazine, the hydrochloride of which melts at about 208–209° C. when recrystallized from dry ether.

*Example 10*

289 parts of 10-β-chloropropionylphenothiazine, 180 parts of isopropylamine, 20 parts of potassium iodide and 800 parts of methyl ethyl ketone are heated at reflux temperature for 3 days, concentrated on the steam bath, and treated with ice and hydrochloric acid. The aqueous layer is separated and treated with ether to induce precipitation. The crystalline hydrochloride of 10-β-isopropyl-aminopropionylphenothiazine is collected on a filter and recrystallized from dilute isopropanol. The colorless crystals melt at about 227° C. with decomposition.

*Example 11*

A solution of 289 parts of 10-β-chloropropionyl-phenothiazine and 200 parts of isobutylamine in 1600 parts of toluene is heated at reflux temperature for 3 hours, concentrated and extracted with dilute hydrochloric acid. The aqueous layer is separated and, upon standing at 0° C., the hydrochloride of 10-β-isobutyl-aminopropionylphenothiazine precipitates which, recrystallized from ethanol, melts at about 200–201° C.

*Example 12*

A mixture of 289 parts of 10-β-chloropropionyl-phenothiazine and 250 parts of n-hexylamine in 1600 parts of toluene is heated at reflux temperature for 3 hours and then treated with dilute hydrochloric acid. The resulting precipitate is collected on a filter and recrystallized from ethanol. The hydrochloride of 10-β-n-hexylaminopropionylphenothiazine melts at about 191–192° C.

*Example 13*

289 parts of 10-β-chloropropionylphenothiazine are heated at reflux temperature for 2 days with 297 parts of cyclohexylamine and 10 parts of potassium iodide in 800 parts of methyl ethyl ketone and then concentrated and treated with ice and hydrochloric acid. The aqueous layer is separated and treated with benzene. On standing the 10-β-cyclohexylaminopropionylphenothiazine precipitates. Recrystallized from dilute isopropanol it melts at about 206–207° C. with decomposition.

*Example 14*

100 parts of 10-β-diethylaminopropionylphenothiazine, prepared as in Example 7, are treated with 228 parts of methyl iodide in 400 parts of methyl ethyl ketone at 0° C. for 1 hour and then treated with ether. An oily precipitate forms which solidifies on standing for several hours. Recrystallized from ethanol, the methiodide of 10-β-diethylaminopropionylphenothiazine melts at about 202–203° C.

Upon addition of 150 parts of methyl bromide to a solution of 150 parts of 10-β-diethylaminopropionyl-phenothiazine in 400 parts of methyl ethyl ketone, an oily precipitate forms which solidifies on standing. The crystalline methobromide melts at about 202–204° C.

*Example 15*

To a solution of 120 parts of 10-β-dimethylaminobu-tyrylphenothiazine, prepared as in Example 4, in 400 parts of methyl ethyl ketone, there are added 120 parts of methyl bromide in a pressure vessel. The resulting white precipitate of the methobromide of 10-β-dimeth-ylaminobutyrylphenothiazine, recrystallized from dilute isopropanol, melts at about 237° C. with decomposition.

Treatment of 120 parts of the 10-β-dimethylamino-butyrylphenothiazine in 400 parts of methyl ethyl ketone with 177 parts of ethyl bromide at 80° C. for 5 hours yields on chilling the ethobromide which, recrystallized from dilute isopropanol, melts at about 212–213° C.

*Example 16*

A mixture of 450 parts of 10-β-chlorobutyrylpheno-thiazine, 300 parts of diethylamine, and 10 parts of potassium iodide in 800 parts of methyl ethyl ketone are heated in a pressure vessel at 85° C. for 10 hours. After cooling and concentration on the steam bath, ice, hydrochloric acid, and ether are added. The aqueous layer is rendered alkaline and extracted with ether. The ether extract is dried and the solvent is evaporated. 150 parts of 10-β-diethylaminobutyrylphenothiazine are heated with 340 parts of methyl iodide and 400 parts of methyl ethyl ketone at 45° C. for 1 hour and then chilled. The precipitated methiodide is collected on a filter and melts at about 215–216° C.

The methobromide of 10-β-diethylaminobutyrylpheno-thiazine, prepared by heating of 100 parts of 10-β-dieth-ylaminobutyrylphenothiazine, 100 parts of methyl bromide and 400 parts of methyl ethyl ketone at 80° C., melts at about 199–200° C. when recrystallized from isopropanol.

*Example 17*

A solution of 289 parts of 10-β-chloropropionyl-phenothiazine, 202 parts of di-n-propylamine and 10 parts of potassium iodide in 800 parts of methyl ethyl ketone is heated at reflux temperature for 3 days, concentrated on the steam bath, and then treated with ice, dilute hydrochloric acid and ether. The aqueous layer is separated, rendered alkaline and extracted with ether. The ether extract is dried and concentrated and the residue recrystallized with charcoal from petroleum ether. The 10-β-dipropylaminobutyrylphenothiazine thus obtained melts at about 65–66° C.

*Example 18*

150 parts of 10-β-piperidinopropionylphenothiazine, prepared as in Example 1, and 200 parts of methyl bromide in 600 parts of methyl ethyl ketone are heated in a pressure vessel at 85° C. for 2 hours and then chilled. The precipitated methobromide of 10-β-piper-idinopropionylphenothiazine melts at about 196–197° C.

*Example 19*

600 parts of 10-β-chlorobutyrylphenothiazine are heated at reflux temperature for 12 hours with 500 parts of piperidine and 20 parts of potassium iodide in 1600 parts of methyl ethyl ketone. After concentration on the steam bath the residue is treated with dilute hydrochloric acid and toluene. The mixture is heated until complete solution occurs, whereupon the aqueous layer is separated, rendered alkaline, and extracted with benzene. This extract is dried and concentrated to yield the 10-β-piper-idinobutyrylphenothiazine as an oil.

Treatment of a benzene solution of this base with alcoholic hydrogen chloride yields the crystalline hydrochloride which, recrystallized from dilute isopropanol, melts at about 202–203° C.

150 parts of 10-β-piperidinobutyrylphenothiazine are heated with 150 parts of methyl bromide in 400 parts of methyl ethyl ketone in a pressure reactor at 80° C. until a solid precipitate forms. Recrystallized from dilute isopropanol, this methobromide melts at about 194–195° C.

*Example 20*

A mixture of 289 parts of 10-β-chloropropionylpheno-thiazine, 200 parts of pyrrolidine, 10 parts of potassium iodide and 800 parts of methyl ethyl ketone is heated at reflux temperature for 10 hours, concentrated, and treated with ice, dilute hydrochloric acid and ether. The aqueous layer is separated and rendered alkaline by addition of ether. Upon standing the 10-β-pyrrolidinopropionyl-phenothiazine precipitates which, recrystallized from petroleum ether, melts at about 106–107° C.

*Example 21*

A mixture of 350 parts of 10-β-chlorobutyrylpheno-thiazine, 200 parts of pyrrolidine, and 10 parts of potassium iodide in 1600 parts of methyl ethyl ketone is heated at reflux temperature for 10 hours, concentrated and dissolved by warming with dilute hydrochloric acid and toluene. The aqueous layer is separated, rendered alkaline, and extracted with warm benzene. The benzene extract is dried and concentrated to yield 10-β-pyrrolidinobutyrylphenothiazine.

The methobromide is obtained by treatment of 220 parts of the base with 150 parts of methyl bromide in 600 parts of methyl ethyl ketone, separation of the precipitate which gradually solidifies, and recrystallization from isopropanol. The salt melts at about 171–173° C.

Example 22

A mixture of 350 parts of 10-β-chlorobutyrylphenothiazine, 250 parts of morpholine, 10 parts of potassium iodide in 1600 parts of methyl ethyl ketone is heated at reflux temperature for 15 hours, concentrated and then warmed with dilute hydrochloric acid until all material dissolves. The aqueous layer is rendered alkaline and extracted with warm benzene. The benzene extract is dried and evaporated to yield the 10-β-morpholinobutyrylphenothiazine which, recrystallized from 95% ethanol, melts at about 133–134° C.

A benzene solution of this base is treated with alcoholic hydrogen chloride, chilled and treated with ether. Crystallized from isopropanol and ethyl acetate, the hydrochloride melts at about 188–189° C.

100 parts of 10-β-morpholinobutyrylphenothiazine and 100 parts of methyl bromide in 600 parts of methyl ethyl ketone are heated in a pressure reactor at 80° C. for 3 hours. The resulting solid methobromide melts at about 211–212° C.

Example 23

A mixture of 400 parts of phenothiazine and 500 parts of α,β-dibromopropionyl chloride in 5000 parts of toluene is heated at reflux temperature for 10 hours, stirred with charcoal, filtered and evaporated to leave the α,β-dibromopropionylphenothiazine as a thick oil. 780 parts of this oil are heated at reflux temperature with 1000 parts of morpholine in 4500 parts of benzene at reflux temperature for 48 hours, cooled and filtered. The filtrate is concentrated and then treated with an excess of dilute hydrochloric acid to obtain a heavy precipitate which is collected on a filter and digested with a solution of 250 parts of hydrogen chloride in 8000 parts of water. After cooling the precipitate is collected on a filter and washed with acetone in which the product is slightly soluble. The resulting α,β-dimorpholinopropionylphenothiazine hydrochloride melts at about 229–230° C. with decomposition.

Example 24

A mixture of 300 parts of 10-β-chloropropionylphenothiazine, 250 parts of 2,6-dimethylmorpholine and 20 parts of potassium iodide in 2400 parts of methyl ethyl ketone is heated at reflux temperature for 10 hours, concentrated on the steam bath, and treated with warm dilute hydrochloric acid. The rather insoluble hydrochloride precipitates which is extracted with 25,000 parts of hot water. On chilling 10-β-(2,6-dimethylmorpholino)propionylphenothiazine hydrochloride precipitates which melts at 222–223° C. and has the structural formula

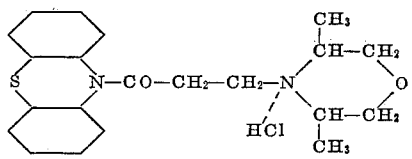

Example 25

A mixture of 300 parts of 10-β-chloropropionylphenothiazine, 200 parts of 2-methylpiperidine and 10 parts of potassium iodide in 1200 parts of methyl ethyl ketone is heated at reflux temperature for 10 hours, cooled and filtered. The filtrate is extracted with dilute hydrochloric acid, rendered alkaline and extracted with ether. The ether extract is dried and evaporated. An ether solution of the residue is stirred with charcoal, filtered and the filtrate is treated with alcoholic hydrogen chloride to form the hydrochloride of 10-β-(2-methylpiperidino)propionylphenothiazine which, on recrystallization from methyl cyclopropyl ketone, melts at about 190–191° C.

Example 26

A solution of 289 parts of 10-β-chloropropionylphenothiazine and 100 parts of N-methylpiperazine in 1600 parts of methyl ethyl ketone is heated at reflux temperature for 10 hours, cooled and the precipitate collected on a filter. Recrystallized from ethanol, the 10-β-(N'-methyl - N - piperazino)propionylphenothiazine hydrochloride melts at about 206–207° C. It has the structural formula

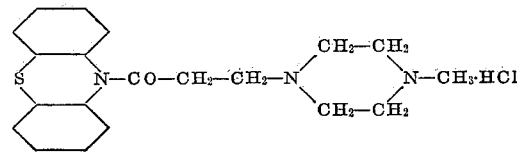

Example 27

A mixture of 289 parts of 10-β-chloropropionylphenothiazine and 150 parts of allylamine in 1600 parts of toluene is heated at reflux temperature for 12 hours, then cooled and extracted with dilute hydrochloric acid. The extract is rendered alkaline and extracted with ether. This ether extract is dried over anhydrous potassium carbonate, filtered and evaporated to yield 10-β-allylaminopropionylphenothiazine. An ether solution of this base is treated with one equivalent of alcoholic hydrogen chloride to cause formation of a solid hydrochloride which, recrystallized from dilute isopropanol, melts at about 165–166° C.

Example 28

A mixture of 289 parts of 10-β-chloropropionylphenothiazine, 194 parts of diallyamine and 10 parts of potassium iodide in 800 parts of methyl ethyl ketone is heated at reflux temperature for 3 days and then concentrated and treated with ice, hydrochloric acid, and ether. The aqueous layer is separated, rendered alkaline by addition of dilute sodium hydroxide, and extracted with ether. This ether extract is dried and evaporated to yield 10-β-diallylaminopropionylphenothiazine as an oil. Treatment of an ether solution of this oil with an equivalent of alcoholic hydrogen chloride and recrystallization of the precipitate yields a crystalline hydrochloride melting at about 131–133° C.

Example 29

100 parts of phenothiazine and 86 parts of ω-chlorocaproyl chloride in 800 parts of anhydrous toluene are heated at reflux temperature for 15 hours. The hot solution is stirred with decolorizing charcoal, filtered and evaporated to yield 10-ω-chlorocaproylphenothiazine.

33 parts of this chloride and 12 parts of N-ethyl-α-methyl-β-butenylamine, distilled at 145–150° C., in 80 parts of toluene are heated at reflux temperature for 3 days and then treated with dilute hydrochloric acid. The aqueous layer is separated, washed with ether, rendered alkaline by addition of potassium hydroxide, and extracted with ether. This extract is dried, stirred with decolorizing charcoal, filtered and evaporated to yield an amber, viscous oil. The 10-ω-[N-ethyl-N-(α-methyl-β-butenyl)amino]caproylphenothiazine has the structural formula

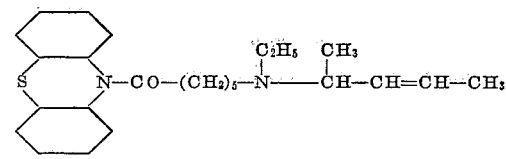

Reaction of 100 parts of 10-β-propionylphenothiazine and 65 parts of N-methylallylamine in 200 parts of toluene by the same procedure yields the 10-β-(N-methyl-N-allylamino)propionylphenothiazine.

Example 30

A mixture of 300 parts of 10-β-chlorobutyrylphenothiazine and 170 parts of N-benzylcrotylamine in 2000 parts of toluene is heated at reflux temperature for 5 days and then treated with dilute hydrochloric acid. The aqueous layer is separated, washed with ether, rendered alkaline by addition of sodium hydroxide and extracted with ether. This extract is dried, stirred with decolorizing charcoal, filtered and evaporated to yield the 10-β-(N-benzyl)crotylaminobutyrylphenothiazine as a light yellow, viscous, high boiling oil.

Example 31

A mixture of 20 parts of 10-chloroacetylphenothiazine and 10 parts of allylaminopropanol in 200 parts of toluene is heated at reflux temperature for 3 days and then treated with dilute hydrochloric acid. The aqueous layer is separated, washed with ether, treated with an excess or ammonium hydroxide and extracted with ether. The resulting extract is dried, stirred with decolorizing charcoal, filtered and evaporated to yield the allylhydroxypropylaminoacetylphenothiazine as a yellowish, viscous, high boiling oil of the structural formula

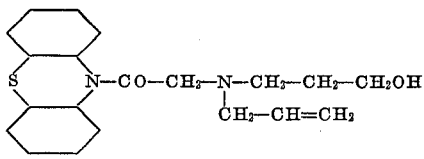

Example 32

A mixture of 580 parts of 10-β-chloropropionylphenothiazine, 630 parts of bis-(β-hydroxyethyl)amine, and 20 parts of potassium iodide in 2400 parts of methyl ethyl ketone is heated at reflux temperature for 3 days after which most of the solvent is distilled off. The residue is dissolved in warm dilute hydrochloric acid and benzene. The aqueous layer is rendered alkaline and the oily precipitate separated and dissolved in chloroform. This chloroform solution is dried and evaporated and the residue is dissolved in a mixture of toluene and ether and treated with 1 equivalent of a 25% solution of hydrogen chloride in anhydrous isopropanol. The precipitate is collected on a filter and recrystallized from dilute isopropanol, using charcoal as a decolorizing agent. The hydrochloride of 10-β-bis(β-hydroxyethyl)aminopropionylphenothiazine melts at about 177–178° C. It has the structural formula

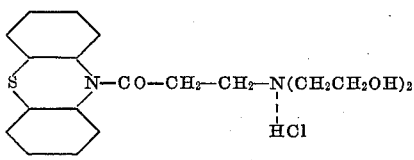

Example 33

To a solution of 580 parts of 10-β-chloropropionylphenothiazine and 10 parts of potassium iodide in 1600 parts of methyl ethyl ketone, 375 parts of β-methylaminoethanol are added and the resulting clear reaction mixture is heated at reflux temperature for 2 days, after which most of the solvent is stripped off in vacuo and the residue is dissolved in a mixture of dilute hydrochloric acid, benzene and ether. The aqueous solution is separated and treated with ammonium hydroxide to yield an oil which solidifies on standing for a short time. Recrystallized from ethanol, the 10-β-(N-methyl-N-hydroxyethylamino)propionylphenothiazine is obtained which melts at about 129–130° C. It has the structural formula

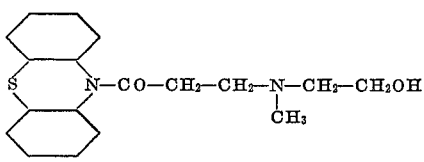

Example 34

A solution of 200 parts of 10-γ-chlorobutyrylphenothiazine and 10 parts of potassium iodide in 1000 parts of methyl ethyl ketone is treated with 100 parts of γ-aminopropanol and heated at reflux temperature for 3 days. After removal of most of the solvent in vacuo the residue is treated with benzene and warm dilute hydrochloric acid, whereupon the aqueous layer is separated, washed with ether, and rendered alkaline by addition of dilute potassium hydroxide. The base is extracted with chloroform, dried over anhydrous calcium sulfate, stirred with decolorizing charcoal, filtered and evaporated. The 10-γ-(γ-hydroxypropyl)aminobutyrylphenothiazine is thus obtained as a light yellow, viscous, high boiling oil which has the structural formula

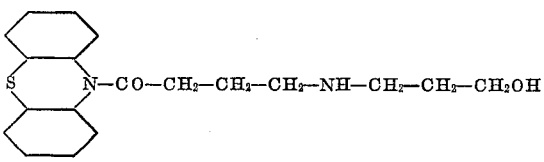

Example 35

200 parts of bis-(β-hydroxy-β-methylpentyl)amine, freshly distilled at about 145° C. and 30 mm. pressure, are added to a solution of 300 parts of 10-β-chlorobutyrylphenothiazine and 10 parts of potassium iodide in 1500 parts of methyl ethyl ketone. The mixture is heated at reflux temperature for 2 days after which most of the solvent is evaporated and the residue is dissolved in a mixture of dilute hydrochloric acid and toluene. The aqueous layer is separated, washed with ether, and rendered alkaline by addition of dilute sodium hydroxide. The base is extracted with a mixture of chloroform and ether, dried over anhydrous potassium carbonate, stirred with decolorizing charcoal, filtered and evaporated to yield the 10-β-bis(β-hydroxy-β-methylpentyl)aminobutyrylphenothiazine as an amber, viscous, high boiling oil which has the structural formula

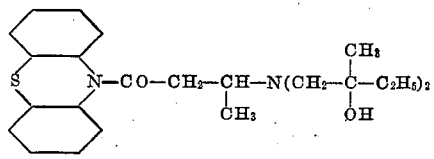

Example 36

A solution of 330 parts of 10-ω-chlorocaproylphenothiazine and 10 parts of potassium iodide in 1500 parts of methyl ethyl ketone is treated with 150 parts of cyclohexylaminoethanol at reflux temperature for 4 days and then concentrated in vacuo. The residue is treated with warm dilute hydrochloric acid and toluene. The aqueous layer is separated, rendered alkaline by addition of dilute ammonium hydroxide and extracted with a mixture of chloroform and ether. This extract is dried over anhydrous calcium sulfate, stirred with decolorizing charcoal, filtered and evaporated to yield the 10-ω-(N-cyclohexyl-N-hydroxyethylamino)caproylphenothiazine as a yellowish, viscous, high boiling oil which has the structural formula

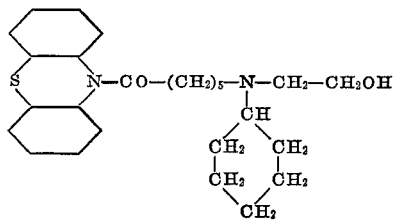

I claim:
1. A member of the group consisting of an aminoalkanoylphenothiazine derivative and salts thereof, said aminoalkanoylphenothiazine derivative having the formula

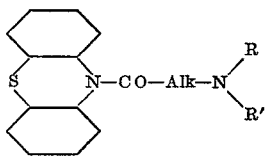

wherein Alk is a lower alkylene radical, R is a lower hydroxyalkyl radical, and R' is a member of the class consisting of hydrogen, lower alkyl, cyclohexyl and lower hydroxyalkyl radicals.

2. A compound of the structural formula

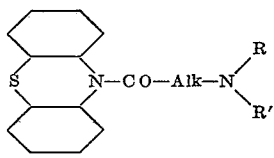

wherein Alk is a lower alkylene radical and R and R' are lower hydroxyalkyl radicals.

3. A compound of the structural formula

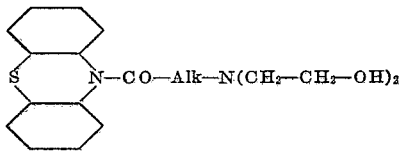

wherein Alk is a lower alkylene radical.

4. A compound of the structural formula

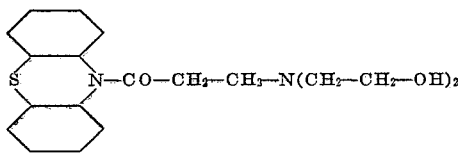

5. A compound of the structural formula

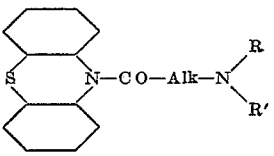

wherein Alk is a lower alkylene radical, R is a lower hydroxyalkyl radical, and R' is a lower alkyl radical.

6. A compound of the structural formula

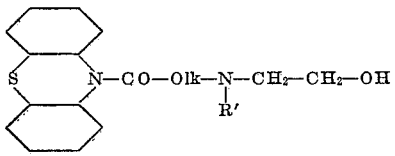

wherein Alk is a lower alkylene radical and R' is a lower alkyl radical.

7. A compound of the structural formula

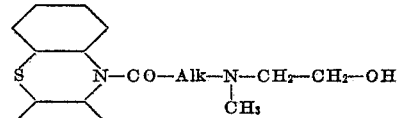

wherein Alk is a lower alkylene radical.

8. A compound of the structural formula

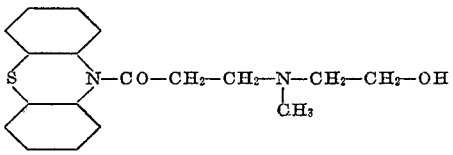

9. A compound of the structural formula

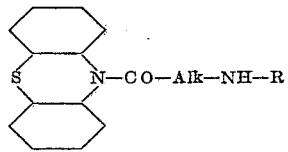

wherein Alk is a lower alkylene radical and R is a lower hydroxyalkyl radical.

10. A compound of the structural formula

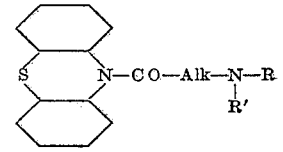

wherein Alk is a lower alkylene radical, R is a lower hydroxyalkyl radical, and R' is a cyclohexyl radical.

References Cited in the file of this patent

UNITED STATES PATENTS

| Number | Name | Date |
|---|---|---|
| 2,512,520 | Cusic | June 20, 1950 |
| 2,519,886 | Charpentier | Aug. 22, 1950 |
| 2,534,237 | Cusic | Dec. 19, 1950 |
| 2,591,679 | Cusic | Apr. 8, 1952 |

OTHER REFERENCES

Haley et al., J. Pharmacol., vol. 95, p. 293, 1949.
Idson, Chemical Reviews, vol. 47, pp. 351-2, 1950.
Idson, Chemical Reviews, vol. 47, p. 493, 1950.